United States Patent [19]

Gantt et al.

[11] 3,764,846

[45] Oct. 9, 1973

[54] HORIZONTAL OUTPUT CIRCUITRY FOR CATHODE RAY TUBE SYSTEM

[75] Inventors: Robert Dwight Gantt, Batavia; Dong Woo Rhee, Williamsville, both of N.Y.

[73] Assignee: GTE Sylvania Incorporated, Seneca Falls, N.Y.

[22] Filed: Mar. 6, 1972

[21] Appl. No.: 232,123

[52] U.S. Cl. .......... 315/27 TD

[51] Int. Cl. .......... H01j 29/70

[58] Field of Search .......... 315/27 TD, 27 R, 315/28, 29, 26, 18

[56] References Cited

UNITED STATES PATENTS 3,385,996 5/1968 Richardson .......... 315/27 R 3,668,463 6/1972 Smith et al. .......... 315/276 D 3,678,331 7/1972 Fischman .......... 315/27 TD

*Primary Examiner*—Carl D. Quarforth

*Assistant Examiner*—J. M. Potenza

*Attorney*—Norman J. O'Malley et al.

[57] ABSTRACT

A horizontal output circuit for a cathode ray tube system includes a transformer with a split primary winding having first and second portions coupled to a potential source and potential reference level respectively and interconnected by an electron device shunted by a series connected charge storage means and a horizontal deflection yoke with the yoke having first and second series connected windings and a junction therebetween coupled to the potential reference level whereby substantially equal potentials of opposite polarity are developed across the first and second windings of the yoke.

9 Claims, 3 Drawing Figures

PATENTED OCT 9 1973 3,764,846

HORIZONTAL OUTPUT CIRCUITRY FOR CATHODE RAY TUBE SYSTEM

BACKGROUND OF THE INVENTION

Generally, cathode ray tube systems include a cathode ray tube with an associated deflection yoke for effecting development of a scanning raster by deflecting an electron beam of the cathode ray tube in both horizontal and vertical directions. The horizontal and vertical deflection of the electron beam is normally affected by individual horizontal and vertical output circuits associated with separate horizontal and deflection coils of the deflection yoke.

Usually, the horizontal output circuitry includes a horizontal output tube and a horizontal output transformer having a primary and secondary winding. The output tube is coupled to circuit ground and via the primary winding to a potential source. A pair of horizontal deflection windings in series connection with a storage capacitor are shunted across the horizontal output tube. The secondary winding of the output transformer may be coupled via a voltage multiplier, for example, to a cathode ray tube.

In operation, the storage capacitor is charged to a potential approximating the potential source and the horizontal output tube is in a non-conductive state. Upon application of a signal to the output tube, due to the transient period of conduction to non-conduction of the output tube and the inductive kick of the horizontal deflection windings, a relatively high flyback pulse potential is developed across the series connected horizontal deflection windings.

Although the above-mentioned horizontal output circuitry has been and still is employed in innumerable forms of apparatus, including television receivers, with high reliability and a vast amount of success, it has been found that there is some apparatus and conditions which leave something to be desired. Moreover, the relatively high potentials accompanying the above circuitry has a deleterious effect upon some forms of apparatus.

For example, it has been found that use of deflection yokes with toroid-wound configurations wherein the horizontal and vertical windings are interleaved is often accompanied by corona and insulation failure problems. Moreover, the insulation failures frequently result from a corona problem which is, in turn, dependent upon the magnitude of the potential applied to the windings.

OBJECTS AND SUMMARY OF THE INVENTION

It is an object of the present invention to provide enhanced horizontal output circuitry for a cathode ray tube system. Another object of the invention is to improve the electrical insulation of interleaved horizontal and vertical windings of the yoke. Still another object of the invention is to provide horizontal output circuitry with a reduced tendency for undesired corona development. A further object of the invention is to provide unique horizontal output circuitry suitable for employment with a toroid deflection yoke in a cathode ray tube system.

These and other objects, advantages and capabilities are achieved in one aspect of the invention by a transformer having a split primary winding with an electron device interconnecting the portions of the split winding and a series of connected potential storage means and pair of horizontal windings shunting the electron device with the junction of the pair of horizontal windings coupled to a potential reference level whereby the pair of windings each have a substantial equal potential of opposite polarity thereacross.

DESCRIPTION OF A PREFERRED EMBODIMENT

Figures 1, 2, 3:
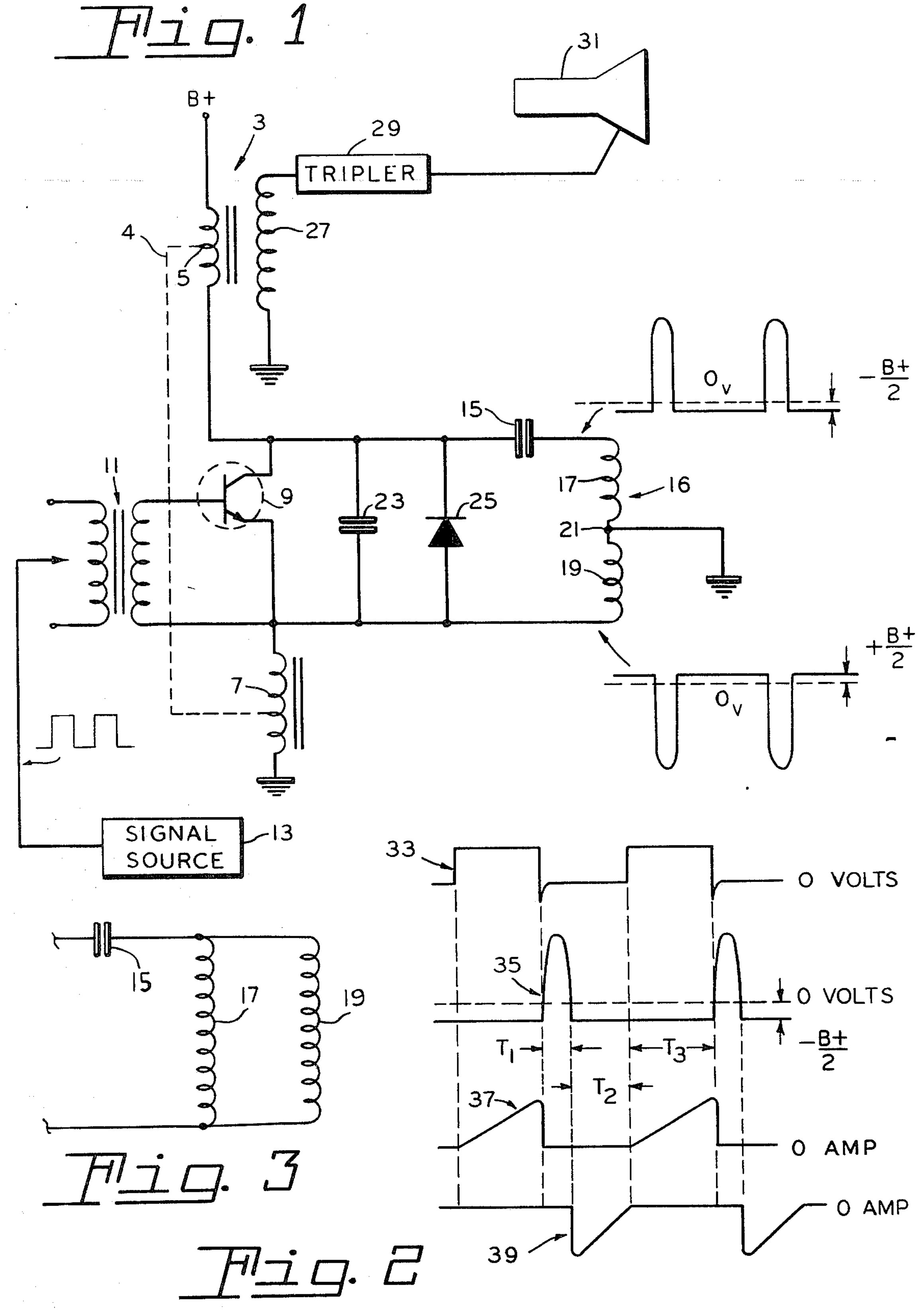
FIG. 1 illustrates a preferred form of horizontal output circuitry suitable for a cathode ray tube system and employing an embodiment of the present invention.
FIG. 2 includes voltage and current curves to assist in the explanation of the apparatus of FIG. 1.
FIG. 3 illustrates an alternate embodiment of horizontal output circuitry.

For a better understanding of the present invention, together with other and further objects, advantages and capabilities thereof, reference is made to the following disclosure in conjunction with the appended claims and accompanying drawing.

Referring to the drawing, a cathode ray tube system includes horizontal output circuitry having a horizontal output transfomrer 3 with a split primary winding 4 having first and second winding portions, 5 and 7 respectively. An electron device 9, illustrated as a transistor, has an output electrode coupled to the first winding portion 5 of the transformer 3 which is, in turn, connected to a potential source B+. The electron device 9 has an input electrode coupled to the second winding portion 7 of the transformer 3 which is connected to a potential reference level such as circuit ground. A transformer winding 11 couples the control electrode of the electron device 9 to a source of control signals 13 such as a horizontal oscillator stage for example.

A charge storage means 15, such as a capacitor, is series connected to the first winding 17 of a deflection yoke 16 having a pair of first and second horizontal windings 17 and 19 respectively connected in series and shunting the electron device 9. The series connected first and second windings 17 and 19 have a junction 21 therebetween which is coupled to a potential reference level such as circuit ground.

Alternatively, the first and second horizontal windings 17 and 19 may be parallel connected intermediate the charge storage means 15 and the junction and second winding portion 7 and electron device 9. Also, a parallel connected capacitor 23 and diode 25 are shunted across the electron device 9 and a secondary winding 27 of the output transformer 3 is coupled to a potential reference level and via a potential multiplier stage 29 to a cathode ray tube 31.

As to operation, the charge storage means 15 stores a potential substantially equal to the value of the potential source B+ as soon as power is applied to the apparatus. Then a signal available from the signal source 13, a 15.75 kHz oscillator signal for example, is applied to the transformer winding 11 and, in turn, to the control electrode of the electron device 9.

Assuming the applied signal advances toward a polarity such that the electron device 9 is rendered conductive, a primary current of the output transformer 3 flows from the potential source B+ to circuit ground by way of the first and second winding portions 5 and 7 of the transformer 3 and the electron device 9. Also, a deflection yoke current flows from the first deflection winding 17 to the second deflection winding 19 via the charge storage means 15 and the electron device 9. Moreover, the potential at the collector or emitter of the electron device 9 is approximately equal to one-half the value of the potential source B+ under such saturation conduction conditions. Thus, the potential applied to the first deflection winding 17 is below ground level by an amount substantially equal to one-half the value of the potential source B+.

Referring to the diagrammatic waveform illustration of FIG. 2, it can readily be seen that a shift in the applied signal 33 such that the electron device 9 is suddenly rendered non-conductive would cause a sudden and decided change in the tuned circuit consisting of the capacitor 23 and the parallel connected inductances of the deflection yoke 16 and the primary winding 4 of the transformer 3. This sudden and decided change in the tuned circuit causes generation of the inductive kick or flyback pulse potential, illustrated as 35, occurring for a time period T1.

At the end of the time period T1, the flyback pulse potential tends to go in a negative direction. However, the damper diode 25 starts to conduct and continues conduction up to the end of a period T2, illustrated as 39. Thus, at the end of the period T2, the damper diode 25 current has returned to approximately zero value and development of a negative-going potential has been inhibited.

Now, the applied signal 33 again advances toward a polarity such that the electron device 9 is rendered conductive, indicated at the start of a period T3, whereupon current 37 flows through the electron device. At the end of this period T3, the applied signal 33 tends toward a negative polarity whereupon the electron device 9 is again turned off. Thereupon, a flyback pulse signal 35 having a period T1 is generated. Moreover, this procedure is repeated in accordance with the applied signal 33.

As a result, the first horizontal winding 17 has a positive-going pulse signal appearing thereacross while the second horizontal winding 19 has a negative-going pulse signal thereacross. Thus, each of the first and second horizontal windings 17 and 19 has a potential thereacross substantially equal to the magnitude of the flyback pulse signal. However, the total potential for effecting deflection by the deflection yoke 16 is substantially equal to twice the magnitude of either one of the pulse signals.

Thus, there has been provided unique horizontal output circuitry suitable for a cathode ray tube system and having numerous changes over other known horizontal output circuitry. The circuitry not only provides a potential of reduced magnitude at the terminals of the windings of a horizontal deflection yoke which, in turn, reduces insulation requirements and the tendency toward undesired corona development but also provides the potential difference necessary to effect the desired electron beam deflection capabilities.

While there has been shown and described what is at present considered the preferred embodiment of the invention, it will be obvious to those skilled in the art that various changes and modifications may be made therein without departing from the invention as defined by the appended claims.

What is claimed is:

1. In a cathode ray tube system horizontal output circuitry comprising:

a cathode ray tube;

transformer means having a split primary winding with first and second portions, said first portion coupled to a potential source and said second portion coupled to a potential reference level;

an electron device coupled to a signal source and intermediate said first and second portions of said split primary winding of said transformer means;

a charge storage means coupled to the junction of said electron device and first portion of said split primary winding of said transformer means; and deflection yoke means associated with said cathode ray tube and having series connected first and second horizontal deflection windings with a junction therebetween coupled to said potential reference level, said first horizontal deflection winding coupled to said charge storage means and said second horizontal deflection winding coupled to the junction of said electron device and said second portion of said split primary winding of said transformer means whereby potentials of substantially equal magnitude and opposite polarity are applied to each of said first and second horizontal deflection windings.

2. The horizontal output circuitry of claim 1 wherein said deflection yoke means is in the form of a toroid-wound deflection yoke having interleaved horizontal and vertical windings.

3. The horizontal output circuitry of claim 1 including a parallel connected capacitor and uni-directional device shunting said electron device.

4. The horizontal output circuitry of claim 1 wherein said electron device includes an output electrode coupled to said charge storage means and to said first portion of said transformer means and an input electrode coupled to said second winding of said deflection yoke means and said second portion of said transformer means.

5. Horizontal output circuitry for a cathode ray tube system comprising:

an electron device;

transformer means having a split primary winding with first and second winding portions, said first winding portion coupling said electron device to a potential source and said second winding portion coupling said electron device to a potential reference level; and a series connected charge storage means and deflection yoke having first and second horizontal windings with said series connected charge storage means and deflection yoke shunting said electron device.

6. The horizontal output circuitry of claim 5 wherein said deflection yoke is in the form of a toroid-wound yoke having interleaved horizontal and vertical windings.

7. The horizontal output circuitry of claim 5 wherein said electron device is in the form of a transisor having input and output electrodes coupled to said first and second winding portions of said transformer means.

8. Horizontal output circuitry for a cathode ray tube system comprising:

an electron device;

transformer means having a split primary winding with first and second winding portions, said first winding portion coupling said electron device to a potential source and said second winding portion coupling said electron device to a potential reference level;

a series connected charge storage means and deflection yoke having first and second horizontal windings with said series connected charge storage means and deflection yoke shunting said electron device; and a parallel coupled capacitor and diode shunting said electron device and said first and second horizontal windings.

9. Horizontal output circuitry for a cathode ray tube system comprising:

an electron device;

transformer means having a split primary winding with first and second winding portions, said first winding portion coupling said electron device to a potential source and said second winding portion coupling said electron device to a potential reference level;

a series connected charge storage means and deflection yoke wherein said series connected charge storage means and deflection yoke includes first and second parallel connected horizontal windings of said deflection yoke in series with said charge storage means shunting said electron device.

* * * * *